(No Model.)

G. R. CULLINGWORTH.
CHUCK FOR ROCK DRILLS.

No. 345,834. Patented July 20, 1886.

Witnesses:
C. E. Sundgren
Emil Herter

Inventor:
George R. Cullingworth
by his Attys
Brown & Hall

UNITED STATES PATENT OFFICE.

GEORGE R. CULLINGWORTH, OF NEW YORK, N. Y.

CHUCK FOR ROCK-DRILLS.

SPECIFICATION forming part of Letters Patent No. 345,834, dated July 20, 1886.

Application filed October 28, 1885. Serial No. 181,123. (No model.)

*To all whom it may concern:*

Be it known that I, GEORGE R. CULLINGWORTH, of the city and county of New York, in the State of New York, have invented an Improvement in Chucks for Rock-Drills, of which the following is a specification.

My invention relates to chucks whereby the drills or bits of rock-drills are detachably secured to the end of the reciprocating piston-rods. Owing to the great concussion of the bit or drill against the rock the shock and wear to which such chucks are subjected are very great; and the object of my invention is to provide a chuck wherein a drill or bit may be held very securely, and in which the clamping members are so sustained and held as to give them great strength and holding power.

The nature of the invention will be hereinafter described, and then pointed out in the claim.

Figure 1:
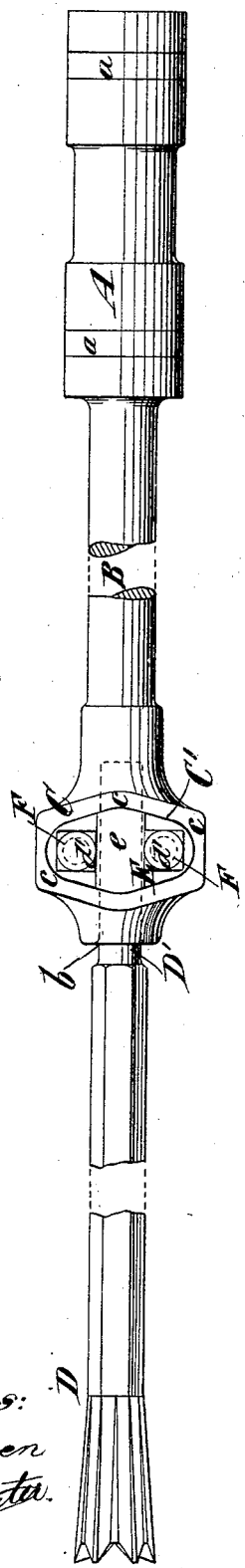
Figure 2:
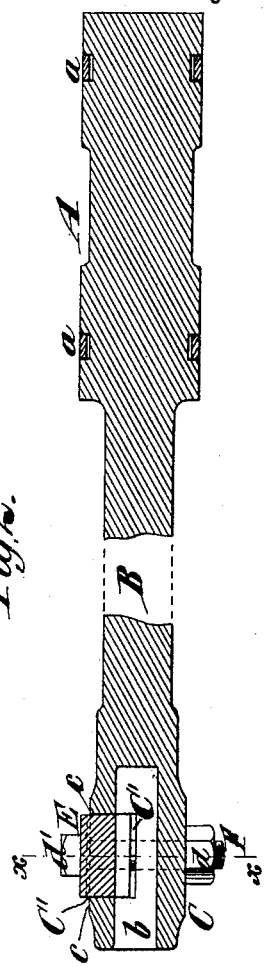
Figure 3:
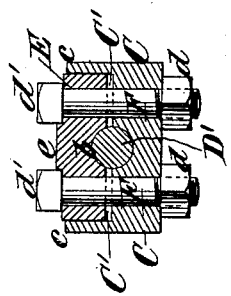

In the accompanying drawings, Figure 1 represents a side view of a drill piston and rod and a drill or bit secured thereto by a chuck embodying my invention. Fig. 2 represents a longitudinal section of the piston, piston-rod, and chuck; and Fig. 3 is a transverse section through the chuck and the drill-shank upon the plane of the dotted line $x\,x$, Fig. 2.

In both Figs. 1 and 2 a portion of the piston-rod is broken away to reduce the length of the drawings, and in all the figures similar letters of reference designate corresponding parts.

A designates the drill-piston, which may be provided with suitable packing-rings, $a$. B designates the piston-rod, and C designates the chuck-body, all of which are represented as formed integral with each other. These parts may be of iron or steel, preferably the latter.

D designates the drill bar or bit, having a shank, D', which is here represented as cylindric, and by which it is secured in the chuck C.

In order to form the chuck-body, the metal from which the piston-rod is made is widened out laterally in opposite directions, so as to produce a flattened formation at the end of the rod, and in this flattened end portion, concentric with the rod B, is formed a socket, $b$, receiving the drill-shank D'. The chuck-body C, upon one of its flat sides, is formed with a recess, socket, or depression, C', which extends inward nearly or quite to the center of the drill-socket $b$, and the outline of which is shown clearly in Fig. 1. This recess or socket C' may be formed by milling or otherwise, and is surrounded on all sides by solid metal, forming a web or raised portion, $c$.

Within the socket, recess, or depression C' is fitted a key or clamp, E, which is of a shape to snugly fit the side walls of the socket or depression C', as shown in Fig. 1, but also in Figs. 2 and 3. This key E is secured in place by bolts F, which pass through it and the chuck-body C on opposite sides of the drill-shank D', and by tightening the nuts $d$ on the bolts F the key E may be drawn inward strongly, and caused to clamp the drill-shank D' between it and the chuck-body. It will be clearly seen from Figs. 2 and 3 that the key E on its inner side is concave or grooved, so as to fit the drill-shank, and so that at the point where the key bears upon the drill-shank the socket $b$ is formed partially in the inner face of the key. Upon the outer face or back of the key E is a raised portion or rib, $e$, against the side edges of which bear the sides of the square bolt-heads $d'$, and by which the bolts are prevented from turning when a wrench is applied to their nuts.

From the above description it will be seen that inasmuch as the key E is sustained and supported on all sides by the web $c$, which forms the walls of the key-recess C', any lateral movement or vibration of the key is prevented, and the two bolts passing through the key and the chuck-body on opposite sides of the drill-shank serve to very securely clamp the key upon the drill-shank.

From the above description it will have been understood that the key recess or socket C' is sufficiently large to take in the entire key E and support it around its entire perimeter, the key having no portion which projects from said socket, and is larger than the socket and without lateral support. The holes for the bolts F are also formed entirely within the key or inside its perimeter, and as the key is supported around its entire perimeter by the wall of metal $c$, the key cannot be fractured through these holes, as might be the case if the said holes were formed in a part of the key larger than that portion which enters the socket or key-recess in the body C and having no lateral support afforded it.

What I claim as my invention, and desire to secure by Letters Patent, is—

The combination, with the chuck-body C, having in it a socket or key-recess, C', of the key E, which is at its largest diameter inserted in the socket or recess and supported around its perimeter by the wall of said socket or recess, the key also having holes for the reception of bolts formed entirely within its perimeter, and the bolts F, passing through the holes in said key and serving to secure it to the chuck-body, substantially as herein described.

G. R. CULLINGWORTH.

Witnesses:
 FREDK. HAYNES,
 HENRY MCBRIDE.